US012748723B2

(12) United States Patent
Hopper et al.

(10) Patent No.: US 12,748,723 B2
(45) Date of Patent: Sep. 29, 2026

(54) EFFICIENT SELECTION OF SINGLE INSTRUCTION MULTIPLE DATA OPERATIONS FOR NEURAL PROCESSING UNITS

(71) Applicant: Tesla, Inc., Austin, TX (US)

(72) Inventors: Daniel Hopper, Austin, TX (US); Peter Sassone, Austin, TX (US); James Longino, Austin, TX (US)

(73) Assignee: TESLA, INC., Austin, TX (US)

( * ) Notice: Subject to any disclaimer, the term of this patent is extended or adjusted under 35 U.S.C. 154(b) by 3 days.

(21) Appl. No.: 18/861,756

(22) PCT Filed: May 9, 2023

(86) PCT No.: PCT/US2023/021565
§ 371 (c)(1),
(2) Date: Oct. 30, 2024

(87) PCT Pub. No.: WO2023/220073
PCT Pub. Date: Nov. 16, 2023

(65) Prior Publication Data

US 2025/0307206 A1 Oct. 2, 2025

Related U.S. Application Data

(60) Provisional application No. 63/364,451, filed on May 10, 2022.

(51) Int. Cl.
*G06F 15/80* (2006.01)
*G06F 9/38* (2018.01)
*G06N 3/0464* (2023.01)

(52) U.S. Cl.
CPC ........ *G06F 15/8007* (2013.01); *G06F 9/3887* (2013.01); *G06N 3/0464* (2023.01)

(58) Field of Classification Search
CPC .. G06F 15/8007; G06F 9/3887; G06N 3/0464
See application file for complete search history.

(56) References Cited

U.S. PATENT DOCUMENTS 5,546,503 A * 8/1996 Abe ........................ G06N 3/082 706/25
9,400,955 B2 * 7/2016 Garimella .............. G06N 20/00
(Continued)

OTHER PUBLICATIONS

International Search Report and Written Opinion dated Aug. 17, 2023 in application No. PCT/US2023/021565.

*Primary Examiner* — Corey S Faherty
(74) *Attorney, Agent, or Firm* — Knobbe, Martens, Olson & Bear, LLP

(57) ABSTRACT

Systems and methods for efficient selection of single instruction multiple data operations for neural processing units. An example processor system comprises a matrix processor configured to perform convolutions associated with a neural network and single instruction multiple data (SIMD) processors in communication with the matrix processors, with the SIMD processors being configured to execute a group of operations based on a current position associated with processing the neural network, and with the group of operations being selected from multiple SIMD programs, and with the group of operations being selected from the SIMD programs according to the current position.

17 Claims, 5 Drawing Sheets

(56) References Cited

U.S. PATENT DOCUMENTS

| | | | | |
|---|---|---|---|---|
| 10,922,146 | B1 | 2/2021 | Minkin et al. | |
| 11,055,063 | B2 * | 7/2021 | Goyal | G06F 7/523 |
| 11,157,287 | B2 | 10/2021 | Talpes et al. | |
| 11,157,441 | B2 | 10/2021 | Talpes et al. | |
| 11,544,213 | B2 * | 1/2023 | Kim | G06N 3/063 |
| 2019/0026250 | A1 | 1/2019 | Das Sarma et al. | |
| 2021/0089873 | A1 | 3/2021 | Yang et al. | |
| 2022/0129755 | A1 * | 4/2022 | Keller | G06N 3/0464 |

* cited by examiner

EFFICIENT SELECTION OF SINGLE INSTRUCTION MULTIPLE DATA OPERATIONS FOR NEURAL PROCESSING UNITS

CROSS-REFERENCE TO RELATED APPLICATIONS

This application claims priority U.S. Prov. App. No. 63/364,451 entitled "EFFICIENT SELECTION OF SINGLE INSTRUCTION MULTIPLE DATA OPERATIONS FOR NEURAL PROCESSING UNITS" and filed on May 10, 2022, the disclosure of which is hereby incorporated herein by reference.

BACKGROUND

Technical Field

The present disclosure relates to processing units, and more particularly, to single instruction multiple data processing units.

Description of Related Art

Neural networks are relied upon for disparate uses and are increasingly forming the underpinnings of technology. For example, a neural network may be leveraged to perform object classification on an image obtained via a user device (e.g., a smart phone). In this example, the neural network may represent a convolutional neural network which applies convolutional layers, pooling layers, and one or more fully-connected layers to classify objects depicted in the image. As another example, a neural network may be leveraged for translation of text between languages. For this example, the neural network may represent a recurrent-neural network.

With respect to a convolutional neural network, the network may be separated into convolutional layers, pooling layers, and so on. An example convolutional layer may cause application of a volume of filters or kernels to input data. For example, a first convolutional layer may cause convolutions between image data and filters or kernels. As another example, a subsequent convolutional layer may cause convolutions between feature maps (e.g., output from a prior layer) and filters or kernels. These layers may require a substantial number of operations. For example, there may be millions or billions of multiplies and adds to process a convolutional layer.

Figure 1A:
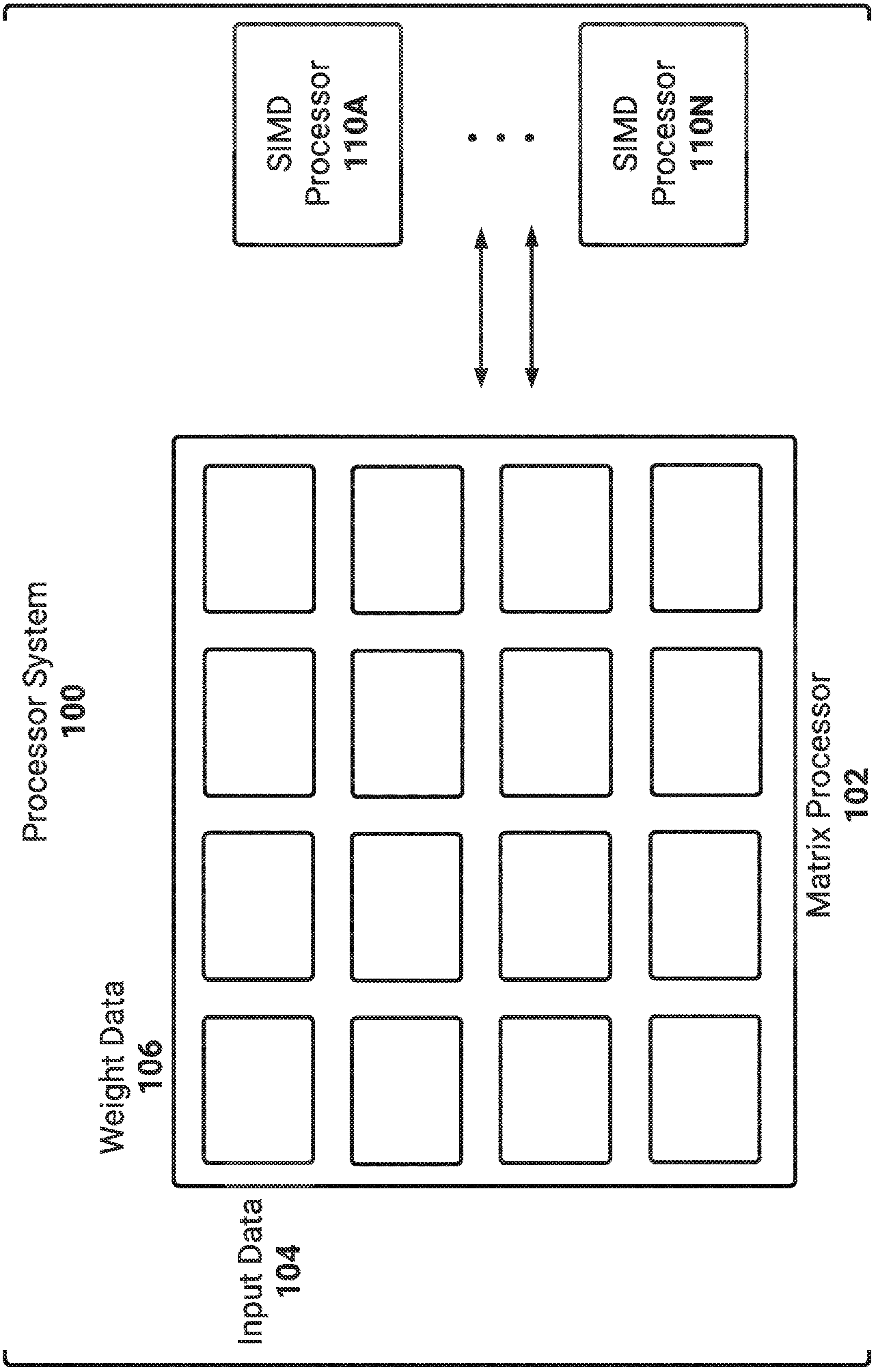
FIG. 1A is a block diagram illustrating an example processor system which includes a matrix processor and one or more single instruction multiple data (SIMD) processors.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

This application describes techniques to efficiently cause execution of operations, or programs (e.g., groups of operations), according to a current position, processing step, or processing operation (herein collectively referred to as a position) associated with a neural network. As will be described, these operations may be implemented by one or more single instructions multiple data (SIMD) processors which are connected to, or otherwise able to receive information from and provide information to, a convolution engine or processor (e.g., matrix processor 102). For example, there may be 1, 2, 5, 17, and so on, SIMD processors. In some embodiments there may be 2, 5, 17, and so on. The operations may be associated with quantizing received data, normalization (e.g., redistributing data values evenly within a range of the bitsize used for computation), clearing of states, loading of constants, storing statistics associated with processing the neural network or a portion thereof (e.g., a layer), and so on.

As known by those skilled in the art, predication is an example technique to selectively execute operations according to the state of a mask or predicate (e.g., predicate register). For example, predication may use conditional instructions which are associated with respective predicates that are evaluated to determine whether they are true. In this example, the conditional instructions are evaluated during each pass through a portion of code. Thus, typically for any negatively evaluated predicate a no operation may be issued. Predication may therefore turn off instructions according to their predicates, but typically also may not skip these instructions to avoid substantial complexity associated with dynamically skipping instructions. Instead, computing cycles are consumed even for negatively evaluated predicates. Thus, predication may reduce fetch performance due to the skipped instructions.

Certain computing tasks, such as processing of neural networks, may have predictable processing paths which repeat during operation of the computing tasks. For example, a convolutional neural network may process data using ordered layers which cause performance of operations on input data and then subsequent routing of data to a subsequent layer. In this example, a convolution engine or processor may be used to perform the computationally intensive convolutions. SIMD processors may be used for other tasks, such as quantizing data as described above. Using predication for operations performed by the SIMD processors may cause substantial wasted computing cycles and increase energy usage. For example, different operations may be performed depending on a particular position in the neural network. In this example, predication may cause a substantial number of operations to be skipped until operations specific to the particular position are reached.

In contrast, this application describes efficient techniques to select operations according to position in a neural network (e.g., processing a layer, an output channel, a portion of an output channel, and so on). The position may also be referred to herein as a stanza and be indicative of operations, or a group of operations, to be performed by the SIMD processors. Advantageously, a program counter may be set based on the stanza (e.g., using a state machine). Thus, the program counter may be limited to operations between the start and end of operations associated with the stanza. These operations may then be implemented by the SIMD processors.

In this way, the techniques described herein may avoid the added computing cycles used by predication to evaluate predicates. Instead, due to the hierarchical structure of processing neural networks the position (e.g., stanza) may indicate the specific operations which are to be executed. For example, a program may be divided or otherwise separated into groups of operations which correspond to the natural nested order of the neural network processing (e.g., start of layer, start of output channel, end of output channel, end of layer, and so on). Thus, instruction fetch may start and end at different points in the program but will, as an example, be a consecutive set of instructions.

While neural networks, and SIMD processors associated with neural network processing (e.g., Neural processing units), are described herein, as may be appreciated the techniques described herein may be applicable to other processors. For example, any application specific processor which leverages software routines at predictable points in a stream of data may utilize the techniques of the present disclosure.

Example Block Diagrams

FIG. 1A is a block diagram illustrating an example processor system 100 which includes a matrix processor 102 and one or more single instruction multiple data (SIMD) processors 110A-110N. In some embodiments, there are more than one SIMD processors 110A-110N. The processor system 100 may be used, in some embodiments, to implement autonomous or semi-autonomous driving of a vehicle. For example, the processor system 100 may be included in a vehicle (e.g., electric vehicle) and use sensor data to implement autonomous or semi-autonomous driving. Example sensors may include image sensors, radar, ultrasonic sensors, Lidar, and so on.

The matrix processor 102 may be used, in some embodiments, to perform convolutions associated with a convolutional neural network or transfer network. For example, input data 104 and weight data 106 may be convolved. The matrix processor 102 may include a multitude of multiply-accumulate units which perform the convolutions. As an example, the matrix processor may use input and weight data which has been organized or formatted to facilitate larger convolution operations. For example, input data 104 may be in the form of a three-dimensional matrix (e.g., two-dimensional data across multiple input channels). In this example, the output data may be across multiple output channels. The matrix processor 102 may thus process larger input data by merging, or flattening, each two-dimensional output channel into a vector such that the entire, or a substantial portion thereof, channel may be processed by the matrix processor 102. As another example, data may be efficiently re-used such that weight data may be shared across convolutions. With respect to an output channel, the weight data 106 may represent weight data (e.g., kernels) used to compute that output channel.

In some embodiments, the techniques described herein may apply the example matrix processor described in U.S. Pat. No. 11,157,287, U.S. Patent Pub. 2019/0026250, and U.S. Pat. No. 11,157,441, which are hereby incorporated by reference in their entirety and form part of this disclosure as if set forth herein.

Thus, in some embodiments, the matrix processor 102 may proceed with computing convolutions for a particular output channel. For example, the matrix processor 102 may compute convolutions based on the weight data 106 and input data 104 which may represent at least a portion of the convolutions for a particular output channel. As may be appreciated, there may be millions, or billions, of operations required to compute the particular output channel. In some embodiments, portions of computations associated with the particular output channel may be referred to as respective passes.

As will be described, during computation of the above-described convolutional neural network the SIMD processors 110A-110N may perform different operations. For example, the SIMD processors 110A-110N may receive output from the matrix processor 102. In this example, output may represent a processing result associated with convolving the input data 104 and weight data 106. Example operations may include quantizing the processing result. Additionally, the SIMD processors may determine statistics associated with processing the particular output channel or layer for which the particular output channel is being determined. Thus, the SIMD processors 110A-110N may monitor for statistics such as the average value, minimum value, maximum value, and so on. Similarly, the SIMD processors 110A-110N may determine statistical information for each output channel being determined for a layer.

As another example, the SIMD processors 110A-110N may provide information to the matrix processor. For example, the SIMD processors 110A-110N may load constants required for processing of a particular layer. In this example, the constants may be loaded into the matrix processor or loaded into the SIMD processors for use. As another example, the SIMD processors 110A-110N may clear a state associated with processing a layer, an output channel, or after a pass.

The SIMD processors 110A-110N may execute operations according to a current position (also referred to herein as a stanza) associated with processing the above-described convolutional neural network. For example, operations to be performed by the SIMD processors 110A-110N may be grouped. A compiler may thus divide a program which includes the operations into chunks (e.g., respective programs) which may be separately executed by the SIMD processors 110A-110N during operation. As an example, during operation of the processor system 100 a group of operations, or more than one group of operations, may be selected for execution by the SIMD processors 110A-110N. In some embodiments, a program counter may be used to limit execution of operations to the group of operations according to the current stanza. The program counter may, as an example, be limited to the start and end pointers such that the group of operations (e.g., particular program) are executed by the SIMD processors 110A-110N. Thus, hardware included in the processor system 100 (e.g., a program counter, a hardware-based state machine) may control selection and implementation of In this way, the SIMD processors 110A-110N may execute specific operations depending on whether a particular layer has begun to be processed, whether a particular output channel has begun to be processed, whether a particular pass has been started, and so on. This flexibility is enabled without requiring computationally costly predication as described above. Thus, the techniques described herein limit an extent to which operations are skipped and no operations issued.

The SIMD processors 110A-110N may additionally be in communication with memory, which is not illustrated in FIG. 1A. For example, the memory may represent SRAM and the SIMD processors 110A-110N may provide a processing result for storage in the SRAM. In this example, the processing result may represent a quantized version of convolutions effectuated by the matrix processor 102.

Figure 1B:
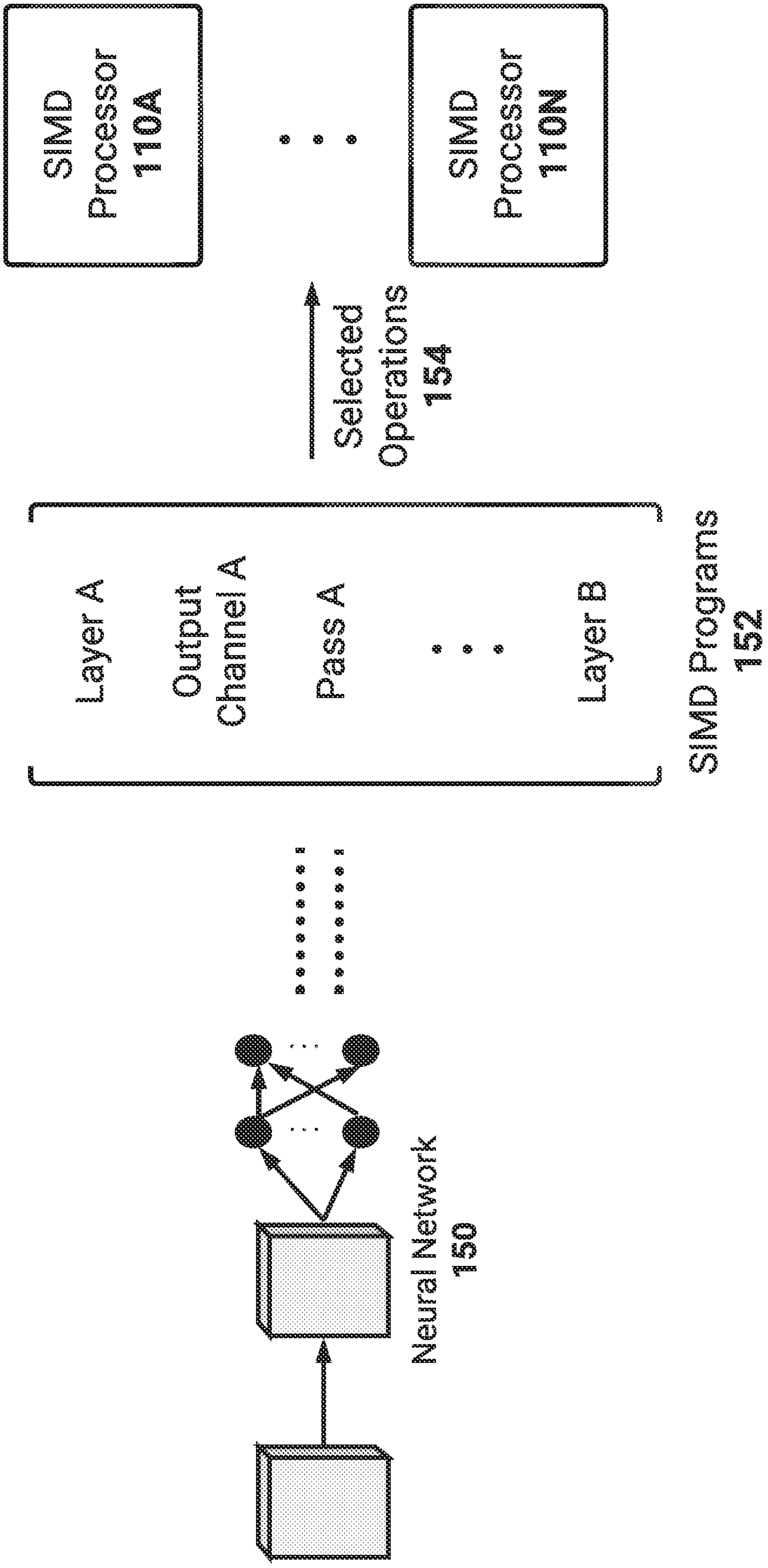
FIG. 1B is a block diagram illustrating detail of example SIMD programs which may be selected for implementation by the SIMD processors.

FIG. 1B is a block diagram illustrating detail of example SIMD programs 152 which may be selected for implementation by the SIMD processors 110A-110N. As described in FIG. 1A, the SIMD processors 110A-110N may execute operations according to a current stanza. For example, the current stanza may indicate a position associated with processing a neural network 150. An example position may indicate that a layer is to be processed. Another example position may indicate that an output channel is to be processed. Another example position may indicate that a pass associated with processing an output channel is to be processed. In some embodiments, the example position may indicate a specific layer, a specific output channel, a specific pass, and so on.

In the illustrated embodiment, the SIMD programs 152 are separated (e.g., grouped) into operations associated with layers, output channels, passes, and so on. During operation of the processor system 100 these different groups may be selected (e.g., via a program counter) and implemented by the SIMD processors 110A-110N based on the current stanza. As illustrated, selected operations 154 from the SIMD programs 152 are being provided to the SIMD processors 110A-110N.

As illustrated, the SIMD programs 152 may be organized according to the normal (e.g., regular) processing through the neural network 150. For example, the different SIMD programs 152 may be selected 154 for implementation based on the progression through the neural network 150. In this example, a state machine may be used to select the SIMD programs for example based on a program counter. Thus, specific operations may be selected based on a layer being initiated (e.g., ‘Layer A’). Similarly, when this layer is started a specific output channel (e.g., ‘Output Channel A’) may be initiated. Similarly, a first pass may be initiated. Upon completion of this first pass, one or more remaining passes to determine the output channel may be performed. Optionally, specific operations may be executed by the SIMD processors 110A-110N for the first pass and remaining passes. A next output channel may then be initiated which may have the same, or different, operations as output channel A. As described herein, example operations may include quantizing data, determining statistical information, and so on.

Below are additional example operations which include example pseudo-code. Each example includes one or more operations to be performed at different stanzas and which form a larger operation.

An example operation may include an argument max operation. For example, this operation may output the maximum value (or index of the maximum value) within a pass of elements. An element (e.g., a new element) may represent an input element (e.g., a single value) being sent from the matrix processor into an SIMD lane (e.g., an SIMD processor) for post-processing. Example pseudo-code which references particular stanzas is included below:

| Stanza | Pseudo SIMD code |
|---|---|
| Open Layer | |
| Open Output Channel | |
| Open Pass | curr_max = 0 |
| All | curr_max = max(new_element, curr_max) |
| Close Pass | store out curr_max |
| Close Output Channel | |
| Close Layer | |

Another example operation may include per channel reduction. This operation may cause the SIMD processors 110A-110N to find the average values included in a channel, for example values between the SIMD processors 110A-110N. For this operation, data may be moved between SIMD processors to effectuate the reduction. Example pseudo-code is included below:

| Stanza | Pseudo SIMD code |
|---|---|
| Open Layer | |
| Open Output Channel | curr_sum = 0 |
| Open Pass | |
| All | curr_sum += new_element<br>store out new_element |
| Close Pass | |
| Close Output Channel | // all lanes will end up collecting 3 other values, but only lane 0 will have the proper sum<br>inbound_sum = shift curr_sum down 1 lane<br>curr_sum += inbound_sum<br>inbound_sum = shift curr_sum down 1 lane<br>curr_sum += inbound_sum<br>inbound_sum = shift curr_sum down 1 lane<br>curr_sum += inbound_sum<br>if (lane==0) store out curr_sum |
| Close Layer | |

Another example operation may include collecting and storing per layer averages optionally while also storing out input elements. Example pseudo-code may include:

| Stanza | Pseudo SIMD code |
|---|---|
| Open Layer | curr_sum = 0 |
| Open Output Channel | |
| Open Pass | |
| All | curr_sum += new_element<br>store out norm_element |
| Close Pass | |
| Close Output Channel | |
| Close Layer | curr_avg = curr_sum / TOTAL_VALS (e.g., total values)<br>store out curr_avg |

Thus, the SIMD programs 152 may provide programmers with arbitrary flexibility to cause execution of operations by SIMD processors 110A-110N. As may be appreciated, in some embodiments these operations may represent respective single instructions which cause lockstep operation of the SIMD processors 110A-110N. In some embodiments the SIMD processors 110A-110N may be separately grouped. For example, a sub-group of the SIMD processors 110A-110N may execute a first SIMD program while a different sub-group may execute a second SIMD program. In this way, there may be groups of SIMD processors performing different operations.

Figure 2:
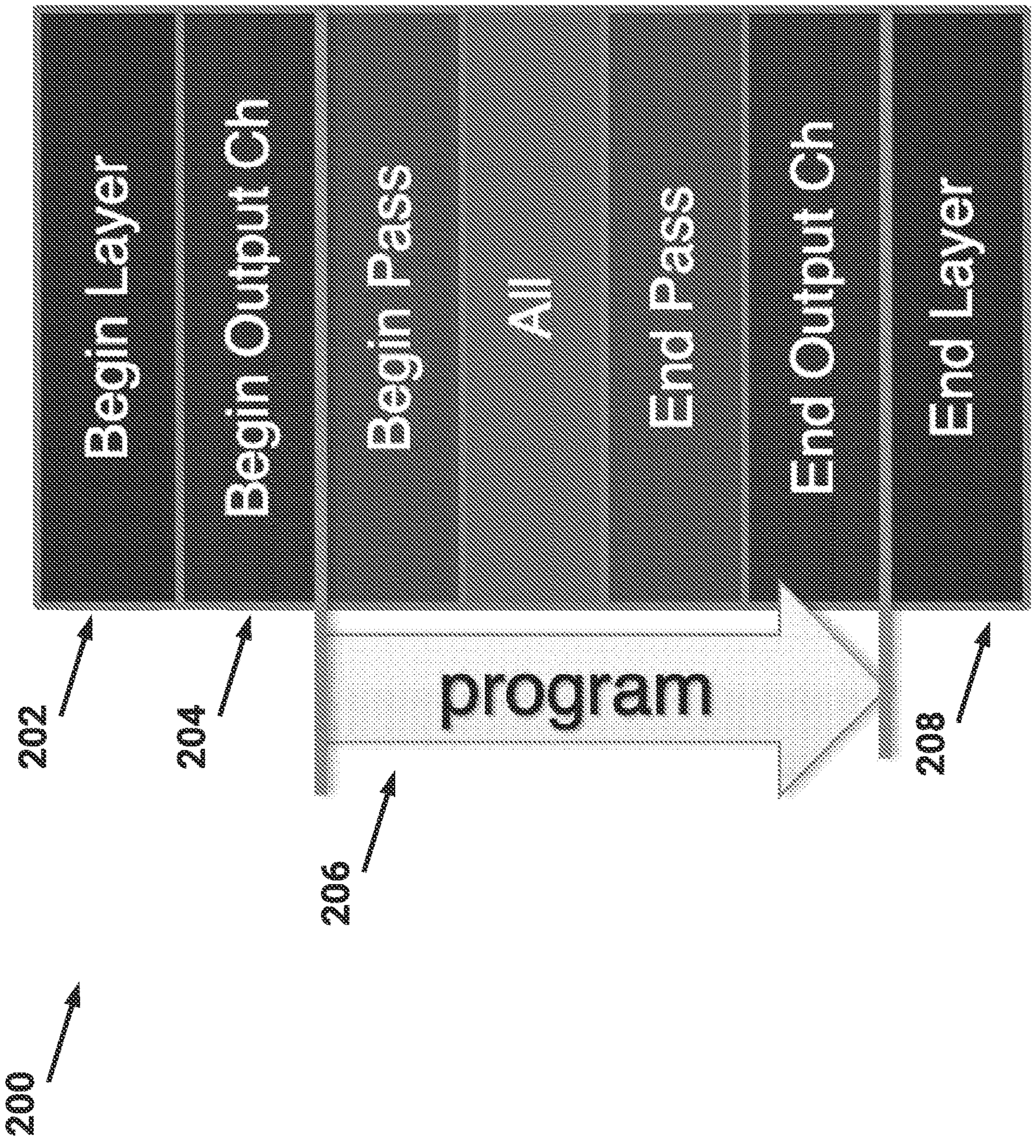
FIG. 2 illustrates a representation of example SIMD programs selected during processing of a layer of a neural network.

FIG. 2 illustrates a representation of example SIMD programs selected during processing of a layer of a neural network. In FIG. 2, an example process flow 200 associated with processing a neural network is illustrated. For example, the process flow 200 identifies different positions, or stanzas, associated with the processing. These positions may form a nested hierarchy of operations (e.g., start group of operations A, start group of operations B, stop group of operations B, start group of operations C, stop group of operations C, stop group of operations A).

In block 202, the position indicates the beginning of a layer. For example, the layer may be a convolutional layer in the neural network. As another example, the layer may represent a different layer (e.g., pooling layer). In block 204, the position indicates the beginning of an output channel. In some embodiments, and as described above in FIG. 1A, the layer 202 may be processed based on processing output channels (e.g., individually processing output channels). However, this processing is by way of example and the techniques described herein are not so limited.

At block 206, the position indicates a beginning pass for the output channel 204. In the illustrated example, SIMD programs have been grouped between the beginning of an output channel 204 and the ending of an output channel 208. For example, at the beginning pass the SIMD programs may cause clearing out of a current state, loading of constants, and soon. The 'All' block may represent operations which are always performed when reached by position. Example operations may include quantizing data. For example, the beginning pass may represent a first pass and subsequently passes may not execute the group of operations for the beginning pass. However, they may execute the operations for the 'All' block. Thus, the 'All' block may optionally be processed once reaching any of the blocks 202-208.

The end pass may represent operations performed once the pass is completed. The end pass may also represent a final pass associated with the output channel. Example operations may include determining statistics for the individual pass or for the passes associated with the output channel. Similarly, the end of the output channel may represent operations associated with completing the output channel or operations associated with completion of all output channels for the layer. Example operations may include writing per channel statistics. For example, average value, maximum value, minimum value, for each output channel or all channels (e.g., for the layer). Additional operations are described in more detail above, for example in combination with pseudocode.

Example Flowchart

Figure 3:
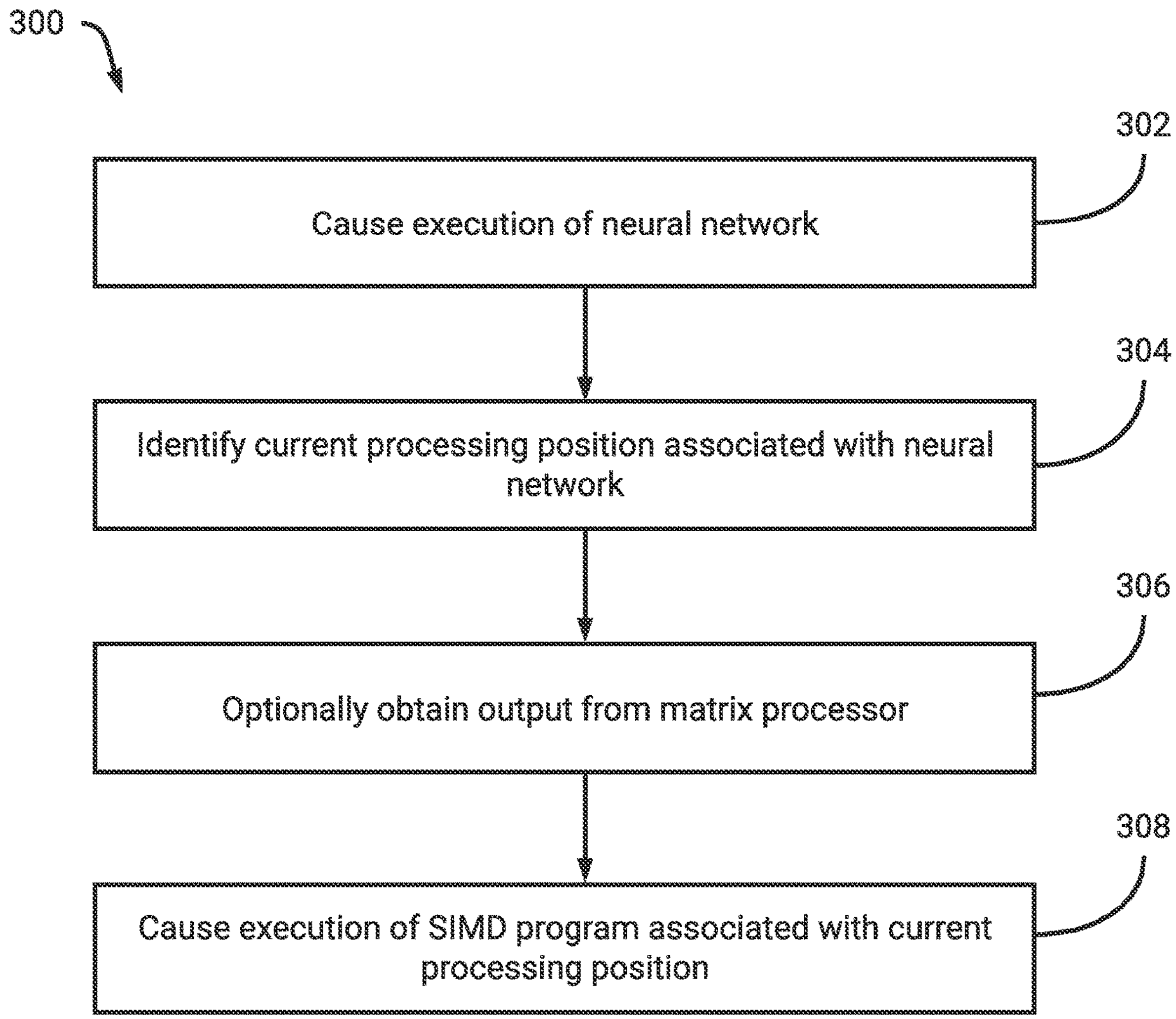
FIG. 3 is a flowchart of an example process for processing a neural network using SIMD stanzas.

FIG. 3 is a flowchart of an example process 300 for processing a neural network using SIMD stanzas. For convenience, the process 300 will be described as being performed by a system (e.g., the processor system 100). In some embodiments, a program counter may identify the current stanza and cause selection of operations for execution by SIMD processors (e.g., SIMD processors 110A-110N).

At block 302, the system causes execution of a neural network. As described herein, the neural network may represent a convolutional neural network. For example, the neural network may be used, in part, for autonomous or semi-autonomous driving. In this example, the neural network may be used to identify objects surrounding a vehicle and characteristics of the objects (e.g., classifications, velocity, acceleration, position, and so on).

At block 304, the system identifies a current position associated with processing the neural network. As described above, the current position may represent a stanza associated with the neural network. Example positions may include a layer, an output channel, a pass, an end of a pass or passes, an end of an output channel, an end of a layer, and so on.

In some embodiments, a program counter may be used to identify the current position. As may be appreciated, the program counter may indicate a current instruction (e.g., a pointer to the current instruction). Based on the current position, the program counter may identify operations for the current position. For example, the program counter may be limited (e.g., by a processor) to a range of instructions which includes the identified operations (e.g., a group of operations). As described above, a program's operations may be grouped. These groups may be associated with respective beginning and ending pointers (e.g., by a compiler). Thus, the program counter may be used to limit execution to the group of operations for the current position based on a beginning and ending pointer.

At block 306, the system obtains output from a matrix processor. For certain positions the SIMD processors may use output from the matrix processor. For example, the SIMD processors may execute operations to quantize the output. For other positions, the SIMD processors may not use, or not yet have access to, output from the matrix processor. As an example, the SIMD processors may load constants (e.g., into the matrix processor or into the SIMD processors for use in quantization, determine statistics, and so on).

At block 308, the system causes execution of a SIMD program associated with the processing position. As described in block 304, a particular program (e.g., group of operations) may be selected for execution by the SIMD processors. For some operations, the SIMD processors may use output from the matrix processor (e.g., for quantization).

Vehicle Block Diagram

Figure 4:
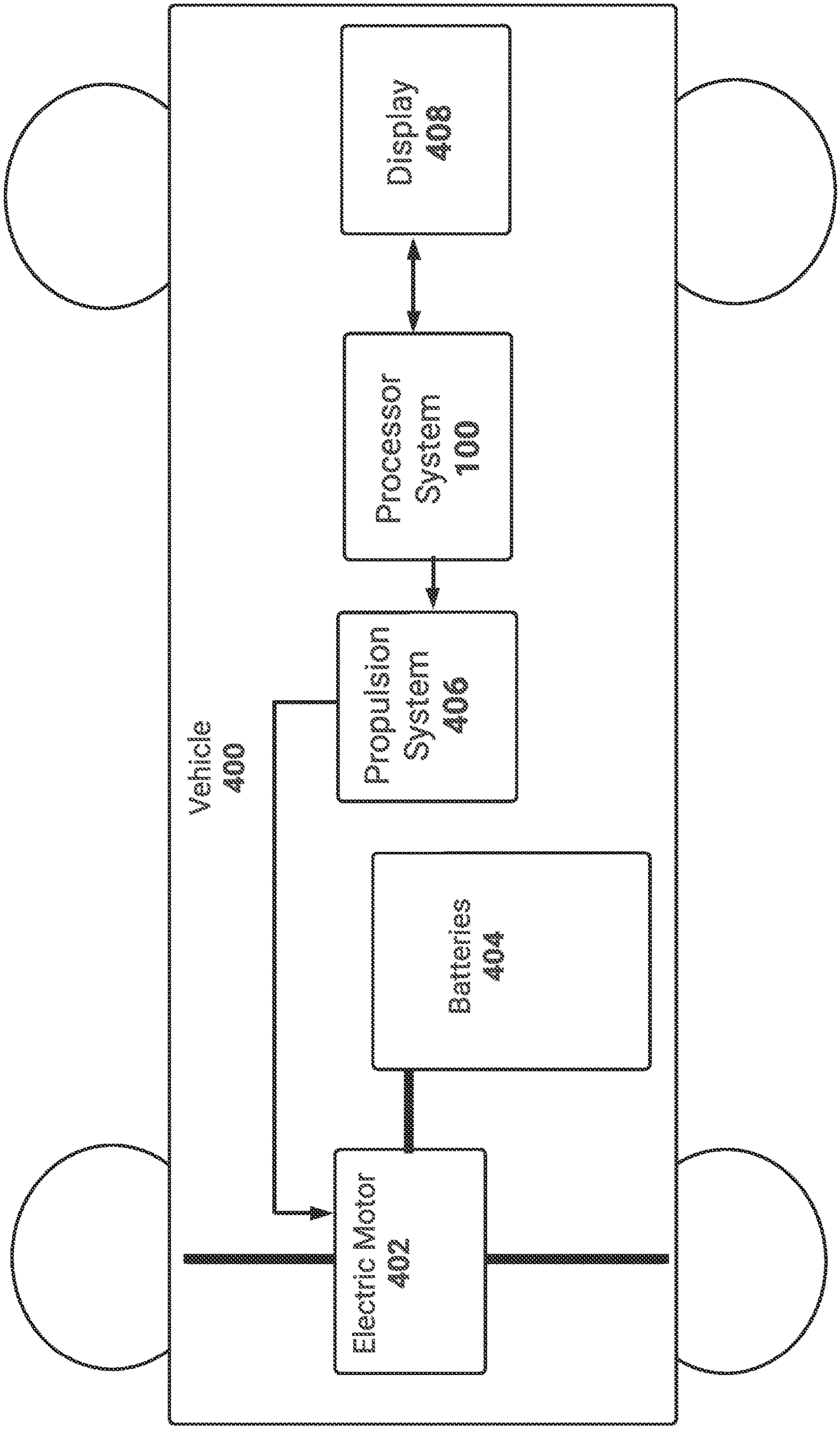
FIG. 4 is a block diagram illustrating an example vehicle which includes the vehicle processor system.

FIG. 4 illustrates a block diagram of a vehicle 400 (e.g., vehicle 102). The vehicle 400 may include one or more electric motors 402 which cause movement of the vehicle 400. The electric motors 402 may include, for example, induction motors, permanent magnet motors, and so on. Batteries 404 (e.g., one or more battery packs each comprising a multitude of batteries) may be used to power the electric motors 402 as is known by those skilled in the art.

The vehicle 400 further includes a propulsion system 406 usable to set a gear (e.g., a propulsion direction) for the vehicle. With respect to an electric vehicle, the propulsion system 406 may adjust operation of the electric motor 402 to change propulsion direction.

Additionally, the vehicle includes the processor system 100 which includes one or more single instruction multiple data processors (e.g., SIMD processors 110A-110N) as described herein. The processor system 100 may process data, such as images received from image sensors positioned about the vehicle 400. The processor system 100 may additionally output information to, and receive information (e.g., user input) from, a display 408 included in the vehicle 400.

OTHER EMBODIMENTS

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A processor system comprising:
- a matrix processor configured to perform convolutions associated with a neural network; and
- one or more single instruction multiple data (SIMD) processors in communication with the matrix processor,
- wherein the SIMD processors are configured to execute a group of operations based on a current position associated with processing the neural network,
- wherein the group of operations is selected from a plurality of SIMD programs, wherein the group of operations is selected from the SIMD programs according to the current position,
- wherein the group of operations is selected using a program counter, and wherein the program counter is used to limit execution between a beginning pointer and an ending pointer, and wherein the beginning pointer and the ending pointer identify the group of operations from the SIMD programs.

2. The processor system of claim 1, wherein the matrix processor is configured to perform convolutions associated with an output layer of a convolutional layer included in the neural network.

3. The processor system of claim 1, wherein the SIMD processors comprise a plurality of SIMD processors.

4. The processor system of claim 1, wherein the current position is indicative of processing one or more of a layer, an output channel, or a pass.

5. The processor system of claim 4, wherein the pass represents a processing chunk or portion of processing associated with an output channel.

6. The processor system of claim 4, wherein the current position is indicative of starting or ending a layer, an output channel, or a pass.

7. The processor system of claim 1, wherein the group of operations is associated with quantizing output from the matrix processor.

8. The processor system of claim 1, wherein the group of operations is associated with determining statistical information.

9. The processor system of claim 1, wherein the SIMD programs are accessed according to the processing flow of the neural network, and wherein predication is not used.

10. A method implemented by a processor system, the method comprising:

causing execution of a neural network;

identifying a current position associated with the neural network; and causing execution, via one or more single instruction multiple data (SIMD) processors, of a SIMD program associated with the current position, wherein the SIMD program is selected from a plurality of SIMD programs, wherein the SIMD program is selected from the SIMD programs according to the current position, wherein the SIMD program is selected using a program counter, wherein the program counter is used to limit execution between a beginning pointer and an ending pointer, and wherein the beginning pointer and the ending pointer identify the SIMD program from the plurality of SIMD programs.

11. The method of claim 10, wherein the SIMD program is associated with quantizing output from a matrix processor.

12. The method of claim 10, wherein the SIMD program is associated with determining statistical information.

13. The method of claim 10, wherein the processor system is configured to perform convolutions associated with an output layer of a convolutional layer included in the neural network.

14. The method of claim 10, wherein the current position is indicative of processing one or more of a layer, an output channel, or a pass.

15. The method of claim 14, wherein the pass represents a processing chunk or portion of processing associated with an output channel.

16. The method of claim 10, wherein the current position is indicative of starting or ending a layer, an output channel, or a pass.

17. The method of claim 10, wherein the SIMD programs are accessed according to the processing flow of the neural network, and wherein predication is not used.

* * * * *